(12) United States Patent
Kuyama et al.

(10) Patent No.: US 7,648,800 B1
(45) Date of Patent: Jan. 19, 2010

(54) POSITIVE ELECTRODE ACTIVE MATERIAL FOR A NON-AQUEOUS ELECTRODE CELL AND NON-AQUEOUS ELECTRODE CELL USING THE SAME

(75) Inventors: Junji Kuyama, Fukushima (JP); Masayuki Nagamine, Fukushima (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/656,777

(22) Filed: Sep. 7, 2000

(30) Foreign Application Priority Data

Sep. 8, 1999 (JP) ............................... P11-254589

(51) Int. Cl.
*H01M 2/00* (2006.01)

(52) U.S. Cl. ................................ 429/231.95
(58) Field of Classification Search ............ 429/231.95, 429/224, 231.8, 218.1, 217, 234, 231.2, 231.5, 429/231.6, 223
See application file for complete search history.

(56) References Cited

U.S. PATENT DOCUMENTS

| | | | | |
|---|---|---|---|---|
| 5,773,168 A * | 6/1998 | Kubo et al. | .................. | 429/223 |
| 5,853,918 A * | 12/1998 | Tanno | ...................... | 429/231.8 |
| 5,869,208 A * | 2/1999 | Miyasaka | .................... | 429/224 |
| 5,948,565 A * | 9/1999 | Kelder | ........................ | 429/224 |
| 5,962,166 A * | 10/1999 | Ein-Eli et al. | ................ | 429/224 |
| 6,083,646 A * | 7/2000 | Sugeno et al. | ......... | 429/231.95 |
| 6,093,503 A * | 7/2000 | Isoyama et al. | ............... | 429/61 |
| 6,103,422 A * | 8/2000 | Kanai | ......................... | 429/224 |
| 6,168,888 B1 * | 1/2001 | Iwata et al. | ............ | 429/231.95 |
| 6,267,943 B1 * | 7/2001 | Manev et al. | ................ | 423/599 |
| 6,325,988 B1 * | 12/2001 | Inoue et al. | .................. | 423/599 |
| 6,337,158 B1 * | 1/2002 | Nakajima et al. | ........... | 429/224 |

* cited by examiner

*Primary Examiner*—Patrick Ryan
*Assistant Examiner*—Monique Wills
(74) *Attorney, Agent, or Firm*—Sonnenschein Nath & Rosenthal LLP

(57) ABSTRACT

The present invention enables to obtain both of a cycle characteristic and a high load characteristic. The present invention discloses a positive electrode active material containing lithium composite manganese oxide having a spinel structure for a non-aqueous electrolyte cell and a non-aqueous electrolyte cell using this material. The lithium composite manganese oxide having spinel structure has its primary particle diameter not less than 0.05 μm and not greater than 10 μm, forming an aggregate, and a specific surface measured by the BET method in a range not less than 0.2 m²/g and not greater than 2 m²/g.

6 Claims, 1 Drawing Sheet

US 7,648,800 B1

POSITIVE ELECTRODE ACTIVE MATERIAL FOR A NON-AQUEOUS ELECTRODE CELL AND NON-AQUEOUS ELECTRODE CELL USING THE SAME

STATEMENT OF CROSS RELATED APPLICATIONS

This application claims priority to and the benefit of the earlier filing date of Japanese patent application, JP P11-254,589, filed on 8 Sep. 1999, the disclosure of which is expressly incorporated by law to the extent permissible by law.

BACKGROUND OF THE INVENTION

1. Field of the Invention

The present invention relates to a positive electrode for a non-aqueous electrolyte cell and a non-aqueous electrolyte cell and in particular, to improvement of a spinel-type lithium composite manganese oxide as an active material.

2. Description of Related Arts

Recently, high-performance, small-size, portable electronic devices have been developed and a secondary cell of a high energy density is required as a drive source for these devices. As a secondary cell used for these electronic devices, there can be exemplified a nickel-cadmium secondary cell, a lead accumulator, nickel-hydrogen secondary cell, lithium-ion secondary cell, and the like. Among them, the lithium-ion secondary cell has a high cell voltage, a high energy density, small self-discharge, and no memory effect.

Currently, in the lithium-ion cell, it is usual that lithium cobaltate ($Li_xCoO_2$, $0 \leq x \leq 1$) having a layered structure is used for the positive electrode and carbon having a layered structure is used for the negative electrode. The lithium cobaltate exhibits a voltage characteristic of 4 V or above and can retain a comparatively stable structure for the lithium-ion doping and dedoping. However, cobalt is limited as resources and expensive. Accordingly, it is desired to use a positive electrode material not containing cobalt.

As a candidate of the positive electrode material not containing cobalt, there can be exemplified lithium nickelate having layered structure ($Li_xNiO_2$, $0 \leq x \leq 1$) and lithium manganate ($LiMn_2O_4$) having spinel structure. Especially, the lithium manganate is cheap and has a high safety, attracting attention as a positive electrode material of the next generation.

However, the lithium manganate has a problem that during a storage at a high temperature and a cycle, the manganese is dissolved into the electrolytic solution, deteriorating the cell characteristic. For practical use, it is necessary to improve the cell characteristic by suppressing the dissolving of manganese.

In order to prevent dissolving of manganese into the electrolytic solution, for example, as is disclosed in Japanese Patent Publication 9-147859, it is effective to reduce the specific surface of the positive electrode active material so as to reduce the contact area with the electrolytic solution. It is true that reduction of the specific surface can reduce the dissolving of the manganese but the reduction of the specific surface results in increase of the particle diameter, deteriorating the reaction at lithium doping and dedoping, which in turn deteriorates charge-discharge characteristic at a high load. The reason of the deterioration of the reaction is considered to be that when the particle diameter is increased, the lithium-ion dispersion becomes slower. In order to increase the speed of the lithium dispersion, the crystal particle diameter should be small. Thus, the particle diameter control alone cannot achieve both of the cycle characteristic and the high load characteristic.

SUMMARY OF THE INVENTION

It is therefore an object of the present invention to provide a positive electrode active material capable of achieving both of the cycle characteristic and the high load characteristic for a non-aqueous electrolyte cell and to provide a production method thereof and a non-aqueous electrolyte cell.

In order to solve the aforementioned problem, a study has been made on the physical properties of the positive electrode material and the cell deterioration due to manganese dissolving and it has been found that the manganese dissolving amount depends on the specific surface obtained by the BET method and the manganese dissolving amount is reduced as the specific surface obtained by the BET method is reduced. Furthermore, the specific surface obtained by the BET method becomes smaller when a primary particle diameter which is small forms an aggregate. The present invention has been completed by optimizing the sintering condition and the crush condition and controlling the primary particle size and the specific surface obtained by the BET method. Here, the term "aggregate" means several unit particles (primary particles) collected by a chemical connection force to form a composite particle (secondary particle).

The positive electrode active material according to the present invention contains lithium composite manganese oxide having spinel structure for a non-aqueous electrolyte cell whose primary particle diameter is not less than 0.05 μm and not greater than 10 μm, forming an aggregate, and whose specific surface measured by the BET method is not less than 0.2 $m^2/g$ and not greater than 2 $m^2/g$.

Moreover, the non-aqueous electrolyte secondary cell according to the present invention includes: a positive electrode containing as a positive electrode active material a lithium composite manganese oxide having spinel structure and whose primary particle diameter is not less than 0.05 μm and not greater than 10 μm, forming an aggregate, and whose specific surface measured by the BET method is in a range not less than 0.2 $m^2/g$ and not greater than 2 $m^2/g$, a negative electrode, and an electrolyte.

DETAILED DESCRIPTION OF PREFERRED EMBODIMENTS

Figure 1:
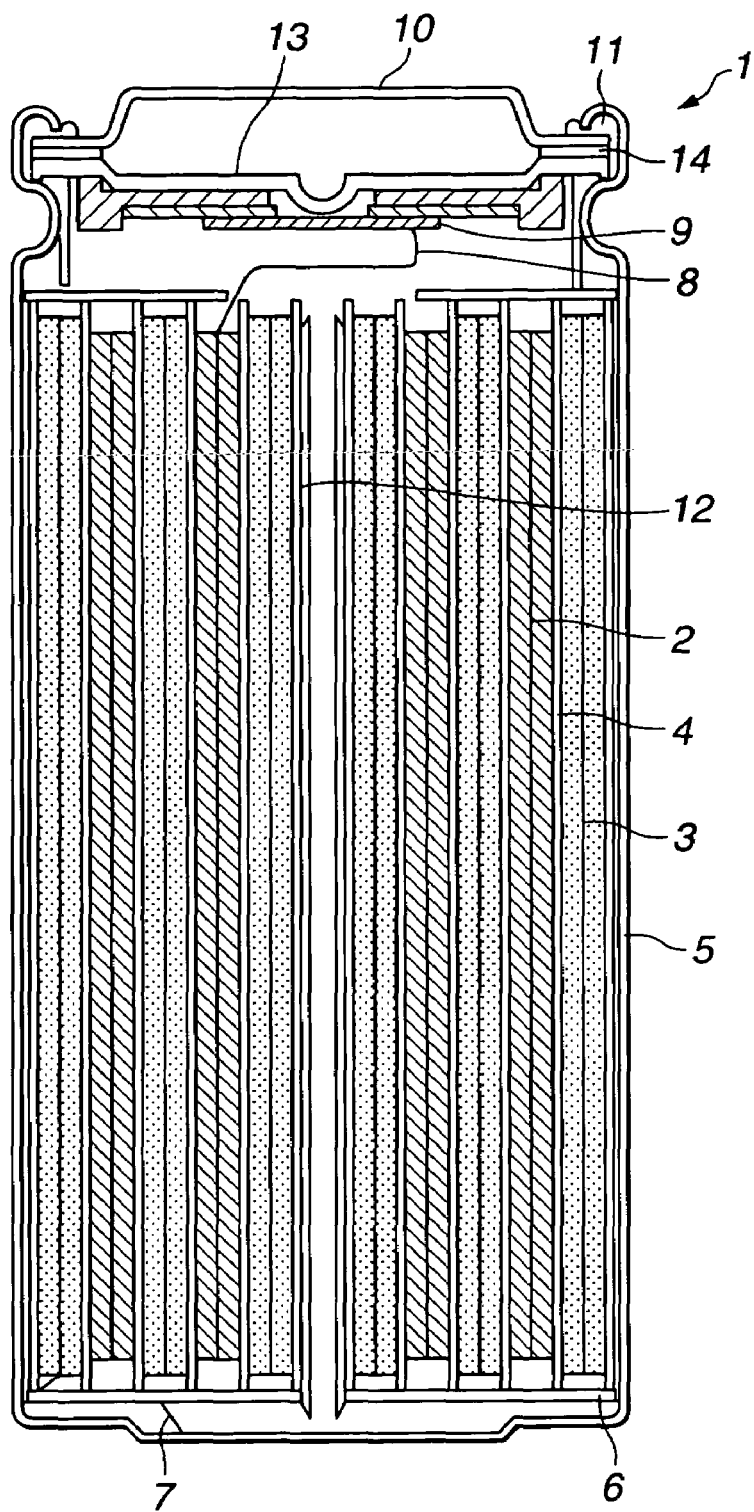
FIG. 1 is a cross sectional view showing a configuration example of a cylindrical non-aqueous electrolyte cell.

Description will now be directed a positive electrode material for a non-aqueous electrolyte cell, a production method thereof, and a non-aqueous electrolyte cell using this.

In the present invention, lithium composite manganese oxide having spinel structure is used as the positive electrode active material and its primary particle diameter is defined as not less than 0.05 μm and not greater than 10 μm. When the primary particle diameter is greater than 10 μm, the high ratio discharge characteristic is deteriorated and when the primary particle diameter is smaller than 0.05 μm, it is impossible to obtain a sufficient effect of suppressing manganese dissolving by aggregation.

The primary particle diameter is preferably not less than 0.1 μm and not greater than 5 μm and more preferably, not less than 0.5 μm and not greater than 3 μm.

Furthermore, the material having the aforementioned primary particle diameter has a specific surface defined as not less than 0.2 m$^2$/g and smaller than 2 m$^2$/g when aggregated. This is because when the specific surface is smaller than 0.2 m$^2$/g, the high ratio discharge characteristic is deteriorated, and when the specific surface is greater than 2 m$^2$/g, aggregation cannot suppress the dissolving of the manganese.

The specific surface is preferably not less than 0.2 m$^2$/g and smaller than 1 m$^2$/g and more preferably, not less than 0.25 m$^2$/g and smaller than 0.6 m$^2$/g.

The lithium composite manganese oxide having the spinel structure (spinel type lithium manganate) can contain up to 0.3 atomic ratio of one or more additive elements selected from a group consisting of Ti, V, Cr, Fe, Co, Ni, and Al. The content of the additive element is defined up to 0.3 atomic ratio because when the content of the additive element exceeds 0.3, it becomes difficult to maintain the spinel structure, lowering the cell characteristic.

Accordingly, the aforementioned lithium composite manganese active material can be expressed by a general formula Li$_x$Mn$_{2-y}$M$_y$O$_4$ (wherein $0.90 \leq x \leq 1.4$ and $y \leq 0.30$, and M is one or more elements selected from a group consisting of Ti, V, Cr, Fe, Co, Ni, and Al).

The content of the additive element is not greater than 0.15 and more preferably not greater than 0.10.

In order to obtain such a lithium composite manganese oxide, the starting raw material of lithium composite manganese oxide is mixed with a predetermined composition, subjected to a pressurized molding, and sintered at a temperature not lower than 600° C. but not higher than 900° C.

In this invention, the sintering temperature is defined as not lower than 600° C. and not higher than 900° C. When the sintering temperature is lower than 600° C., it is impossible to obtain a sufficient aggregation of the primary particles which reduces the specific surface. Moreover, when the sintering temperature is higher than 900° C., the primary particle size is increased over than the defined value. The sintering temperature is preferably not lower than 600° C. and not higher than 850° C. and more preferably not lower than 650° C. and not higher than 850° C.

The lithium manganate thus generated can be applied as a positive electrode active material for a non-aqueous electrolyte cell (such as a non-aqueous electrolyte secondary cell) in combination with a negative electrode and an electrolytic solution as follows.

The negative electrode may be any that can reversibly dope and dedope lithium such as pyrocarbons, coke (pitch coke, needle coke, petroleum coke, and the like), graphite, glassy carbon, organic polymer compound sintered body (phenol resin, furan resin, and the like sintered at an appropriate temperature so as to be carbonized), carbon fiber, active carbon, and other carbon materials, or metal lithium, lithium alloy, polymers such as polyacene, polypyrol, and the like.

The electrolytic solution uses lithium salt as an electrolyte which is solved in an organic solvent. Here, the organic solvent is not limited to a particular one. For example, the organic solvent may be propylene carbonate, ethylene carbonate, 1,2-dimethoxyethane, γ-butyrolactone, tetrahydrofuran, 2-methyltetrahydrofuran, 1,3-dioxolane, sulfolane, acetonitrile, diethyl carbonate, dipropyl carbonate, and the like, each of which can be used solely or in combination with one or more of the others.

The electrolyte may be LiClO$_4$, LiAsF$_6$, LiPF$_6$, LiBF$_4$, LiB(C$_6$H$_5$)$_4$, LiCl, LiBr, CH$_3$SO$_3$L$_1$, CF$_3$SO$_3$Li, and the like.

Moreover, the present invention can be applied not only to a non-aqueous electrolyte cell using a non-aqueous electrolytic solution containing an electrolyte solved in a non-aqueous solvent but also to a cell using a solid electrolyte containing an electrolyte dispersed in a matrix polymer as well as to a cell using a gel-like solid electrolyte containing a swelling solvent. Furthermore, the present invention can be applied not only to a secondary cell but also to a primary cell.

The cell according to the present invention may have a cylindrical shape, angular shape, coin shape, button shape, and the like, and is not to be limited to a particular shape. The cell according to the present invention may be a thin type, large-size type, and not to be limited to a particular size.

Next, explanation will be given on a specific configuration example of a non-aqueous electrolyte cell according to the present invention and a production method thereof.

FIG. 1 shows an example of a cylindrical-shape non-aqueous electrolyte cell. Such a non-aqueous electrolyte cell 1 is produced as follows.

The positive electrode 2 is produced as follows. A positive electrode composite agent containing a positive electrode active material (spinel type lithium composite manganese oxide) and a binder is uniformly applied onto a metal foil such as an aluminum foil serving as a positive electrode collector and dried to form a positive electrode active material layer. The aforementioned binder of the positive electrode composite agent may be a known binder and the aforementioned positive electrode composite agent may be added by a known additive.

The negative electrode 3 is produced as follows. A negative electrode composite agent containing a carbon material serving as a negative electrode active material and a binder is uniformly applied onto a metal foil such as a copper foil serving as a negative electrode collector and dried to form a negative electrode active material layer. The aforementioned binder of the negative electrode composite agent may be and known binder and the aforementioned negative electrode composite agent may be added by a known additive.

The positive electrode 2 and the negative electrode 3 thus obtained are attached to each other via a separator 4 formed by, for example, a porous polypropylene film and wound multiple times into an eddy shape so as to constitute a wound-layered body.

Next, an insulation plate 6 is inserted into an iron cell can 5 whose interior is plated by nickel and the wound-layered body is put into the cell can 5. Then, for current collection of the negative electrode, one end of a negative electrode lead 7 formed, for example, from nickel is attached to the negative electrode 3 and the other end is welded to the cell can 5. Thus, the cell can 5 is electrically connected to the negative electrode 3, serving as an external negative electrode of the non-aqueous electrolyte cell 1. Moreover, for current collection of the positive electrode 2, one end of a positive electrode lead 8 formed, for example, from aluminum is attached to the positive electrode 2 and the other end is electrically connected to a cell cover 10 via a current interrupting thin plate 9. This current interrupting thin plate 9 interrupts current according to a cell internal voltage. Thus, the cell cover 10 is electrically connected to the positive electrode 2, serving as an external positive electrode of the non-aqueous electrolyte cell 1.

Next, a non-aqueous electrolytic solution is poured into this cell can 5. This non-aqueous electrolytic solution is prepared by solving an electrolyte in a non-aqueous solvent.

Next, the cell can 5 is caulked via an insulation sealing gasket 11 painted with asphalt, so that the cell cover 10 is fixed. Thus, a cylindrical non-aqueous electrolyte cell 1 is ready.

It should be noted that in the non-aqueous electrolyte cell 1, as shown in FIG. 1, a center pin 12 is provided to be connected to the negative electrode lead 7 and the positive electrode lead

8, a safety valve 13 is provided to outlet an internal gas when a pressure in the cell exceeds a predetermined value, and a PTC element 14 is provided to prevent temperature increase in the cell.

EXAMPLES

Hereinafter, explanation will be given on specific examples of the present invention based on experiment results.

Experiment 1

A Li raw material, a Mn raw material, and an additional element raw material were measured to be 2 kg in total with a predetermined composition and mixed in a rotary ball mill for five hours. The raw material mixture was molded by a pressurized tablet molding apparatus with 400 kgf/cm$^2$ and then sintered in the atmosphere at 800° C. for 15 hours. The sintered active material was crushed in a vibration type ball mill for 10 minutes.

As comparative examples, the raw material mixture was mixed in the rotary ball mill for 5 hours and then without being subjected to pressurized molding, sintered at 800° C. for 15 hours. The sintered mixture was then crushed in the vibration type ball mill for 5 minutes and for 10 minutes to obtain comparative examples.

The positive electrode active materials obtained were subjected to a tissue observation by SEM and a specific surface measurement by BET (named after the Brunauer, Emmett, and Teller equation) method so as to obtain values of the primary particle diameters and specific surfaces.

Table 1 shows the values of the primary particle diameter and specific surface of the active materials thus obtained.

TABLE 1

|  | Composition | Primary Particle Diameter (μm) | Specific surface (m$^2$/g) |
|---|---|---|---|
| Example 1-1 | $Li_{1.01}Mn_2O_4$ | 2.5 | 0.80 |
| Example 1-2 | $Li_{1.02}Mn_{1.98}Co_{0.02}O_4$ | 1.6 | 0.52 |
| Example 1-3 | $Li_{0.96}Mn_{1.90}V_{0.10}O_4$ | 4.0 | 1.36 |
| Example 1-4 | $Li_{1.0}Mn_{1.8}Ni_{0.2}O_4$ | 3.1 | 1.45 |
| Example 1-5 | $Li_{1.00}Mn_{1.85}Fe_{0.15}O_4$ | 8.2 | 1.95 |
| Example 1-6 | $Li_{1.10}Mn_{1.75}Cr_{0.25}O_4$ | 3.6 | 0.84 |
| Comparative Example 1-1 | $Li_{1.03}Mn_{0.96}Ni_{0.04}O_4$ | 0.8 | 2.24 |
| Comparative Example 1-2 | $Li_{0.99}Mn_{0.70}Al_{0.30}O_4$ | 2.3 | 3.58 |
| Comparative Example 1-3 | $Li_{1.08}Mn_{1.85}Co_{0.15}O_4$ | 5.5 | 0.17 |

The aforementioned positive electrode active materials were used to produce cylindrical cells by a method described below and their cell characteristics were evaluated.

In order to produce a positive electrode, 86 weight % of active material powder, 10 weight % of graphite as a conductive material, and 4 weight % of polyvinylidene fluoride (PVdF) as a binder were mixed and dispersed in N-methyl-2-pyrrolidone (NMP) to obtain a positive electrode mixture slurry. This slurry was uniformly applied to both sides of a belt-shaped aluminum foil having a thickness of 20 μm, and after dried, pressed by a roller press to obtain a belt-shaped positive electrode. It should be noted that the filling density of this positive electrode was measured to be 2.8 g/cm$^3$.

Next, a negative electrode was produced as follows. 90 weight % of artificial graphite powder and 10 weight % of PVdF were mixed and dispersed in NMP to obtain a negative electrode mixture slurry. This mixture slurry was uniformly applied onto both sides of a copper foil having a thickness of 10 μm, and after dried, pressed by a roller press to obtain a belt-shaped negative electrode.

The belt-shaped positive electrode and the belt-shaped negative electrode thus obtained was wound multiple times via a porous polyolefin film to obtain an eddy-wound type electrode body. This electrode body was put into an iron cell can plated by nickel and an insulation plate was arranged at the top and bottom of this electrode body. Next, an aluminum positive electrode lead was brought out from the positive electrode collector and welded onto the bottom of the cell can.

On the other hand, the electrolytic solution was prepared as follows.

$LiPF_6$ was solved with concentration of 1 mol/cm$^3$ in a mixture solution of ethylene carbonate and methylethyl carbonate at volume rate of 1:1, so as to obtain a non-aqueous electrolytic solution.

Lastly, the electrolytic solution was poured into the cell can containing the aforementioned electrode body and the cell can was caulked via an insulation sealing gasket so as to fix a safety valve, a PTC element, and a cell cover, thus obtaining a cylindrical cell having an outer diameter of 18 mm and a height of 65 mm.

As an index of manganese dissolving from the positive electrode, a capacity ratio after 200 cycles was obtained with respect to the initial capacity. Moreover, as a high ratio discharge characteristic, a discharge capacity ratio between discharge current of 750 mA and discharge current of 4500 mA was obtained. The results are shown in Table 2.

TABLE 2

|  | Capacity ratio after 200 cycles (%) | 3C/0.5C high ratio discharge capacity ratio (%) |
|---|---|---|
| Example 1-1 | 88 | 72 |
| Example 1-2 | 82 | 73 |
| Example 1-3 | 91 | 78 |
| Example 1-4 | 86 | 74 |
| Example 1-5 | 83 | 71 |
| Example 1-6 | 81 | 73 |
| Comparative Example 1-1 | 71 | 74 |
| Comparative Example 1-2 | 65 | 82 |
| Comparative Example 1-3 | 85 | 38 |

As is clear from Table 2, when crushing, mixing, pressurized molding, and sintering are performed as in Examples 1-1 to 1-6, so as to obtain a primary particle diameter and a specific surface within a range of the present invention, the cell cycle capacity ratio and the high ratio discharge capacity ratio exhibit preferable values. However, as shown in Comparative Examples, when the crushing, mixing, and sintering alone are performed and primary particle diameter or the specific surface is out of the present invention, the cycle capacity ratio or the high ratio discharge capacity ratio is lowered.

Experiment 2

A Li raw material, a Mn raw material, and a Ni raw material were measured to be 2 kg in total with a composition of $Li_{1.0}Mn_{1.8}Ni_{0.2}O_4$ and mixed in a rotary ball mill for five hours. The raw material mixture was molded by a pressurized tablet molding apparatus with 400 kgf/cm$^2$ and then sintered in the atmosphere at various temperatures for 15 hours. The sintered active material was crushed in a vibration type ball mill for 10 minutes. The active material thus obtained was subjected to a tissue observation and a specific surface measurement by the BET method so as to obtain values of the primary particle diameter and the specific surface.

Table 3 shows the values obtained.

TABLE 3

|  | Sintering temperature (° C.) | Primary particle diameter (μm) | Specific surface (m²/g) |
|---|---|---|---|
| Example 2-1 | 600 | 0.2 | 1.88 |
| Example 2-2 | 780 | 3.5 | 1.34 |
| Example 2-3 | 800 | 3.1 | 1.45 |
| Example 2-4 | 900 | 8.2 | 0.39 |
| Comparative Example 2-1 | 560 | 0.04 | 2.47 |
| Comparative Example 2-2 | 920 | 13.8 | 0.18 |

The aforementioned positive electrode active materials were used as the positive electrode material to produce cylindrical cells in the same way as Example 1 and their cell characteristics were evaluated. As an index of manganese dissolving from the positive electrode, a capacity ratio was obtained after 200 cycles with respect to the initial capacity. Moreover, As the high ratio discharge characteristic, a discharge capacity ratio was measured between the discharge current of 750 mA and discharge current of 4500 mA. The results are shown in Table 4.

TABLE 4

|  | Capacity ratio after 200 cycles (%) | 3C/0.5C high ratio discharge capacity ratio (%) |
|---|---|---|
| Example 2-1 | 87 | 73 |
| Example 2-2 | 84 | 75 |
| Example 2-3 | 86 | 74 |
| Example 2-4 | 83 | 72 |
| Comparative Example 2-1 | 62 | 75 |
| Comparative Example 2-2 | 88 | 32 |

As is clear from Table 4, when the sintering temperature is within a range of the present invention and the primary particle diameter and the specific surface are within a range of the present invention, the capacity ratio after cycles and the high ratio discharge capacity ratio exhibit preferable values. However, when the sintering temperature is out of the range of the present invention and the primary particle diameter or the specific surface is out of the range of the present invention, the cycle capacity ratio or the high ratio discharge capacity ratio is lowered.

As is clear from the above explanation, according to the present invention, by defining the primary particle diameter and the specific surface of the spinel type lithium composite manganese oxide, it is possible to provide a positive electrode active material for a non-aqueous electrolyte cell and a non-aqueous electrolyte cell having an excellent high ratio discharge characteristic with reduced cell deterioration due to manganese dissolving.

What is claimed is:

1. A method of producing a positive electrode active material for a non-aqueous electrolyte cell, comprising the sequential steps of:
    (1) mixing ingredients of a lithium composite manganese oxide;
    (2) molding the mixture of said ingredients of a lithium composite manganese oxide-under pressure; and
    (3) sintering the molded mixture at a temperature not lower than 600° C. and not higher than 850° C.,
    wherein
    the lithium composite manganese oxide has a spinel structure and is expressed by a general formula $Li_xMn_{2-y}M_yO_4$ wherein $0.90 \leq x \leq 1.4$; $0 \leq y \leq 0.30$; and M is one or more materials selected from the group consisting of Ti, V, Cr, Fe, Co, Ni, and Al, wherein the lithium composite manganese oxide is in the form of an aggregate having a primary particle diameter of not less than 0.05 pm and not greater than 10 pm, and having a specific surface area measured by the BET method of not less than 0.2 m²/g and not greater than 2 m²/g.

2. The method of producing a positive electrode active material according to claim 1, further comprising pulverizing the sintered mixture.

3. The method of producing a positive electrode active material according to claim 1, wherein said non-aqueous electrolyte cell comprises a positive electrode having a collector and a positive electrode material thereon, the positive electrode material comprising said lithium composite manganese oxide.

4. A method of producing a positive electrode for a non-aqueous electrolyte cell, comprising the sequential steps of:
    (1) mixing ingredients of a lithium composite manganese oxide;
    (2) molding the mixture of said ingredients of said lithium composite manganese oxide under pressure;
    (3) sintering the molded mixture at a temperature not lower than 600° C. and not higher than 850° C.;
    (4) mixing the sintered mixture and at least a binder to obtain a positive electrode composite agent; and
    (5) applying said positive electrode composite agent on a positive electrode collector wherein said lithium composite manganese oxide has a spinel structure and is expressed by a general formula $Li_xMn_{2-y}M_yO_4$, wherein $0.90 \leq x \leq 1.4$; $0 \leq y \leq 0.30$; and M is one or more materials selected from the group consisting of Ti, V, Cr, Fe, Co, Ni, and Al, wherein the lithium composite manganese oxide is in the form of an aggregate having a primary particle diameter of not less than 0.05 pm and not greater than 10 pm, and having a specific surface area measured by the BET method of not less than 0.2 m²/g and not greater than 2 m²/g.

5. The method of producing a positive electrode according to claim 4, further comprising mixing a conductive agent in addition to the binder with the sintered mixture to obtain said positive electrode composite agent.

6. The method of producing a positive electrode according to claim 4, wherein said positive electrode composite agent is applied in the form of a slurry on said positive electrode collector and dried to obtain a positive electrode.

* * * * *